(12) United States Patent
Kaufmann (10) Patent No.: US 7,528,777 B2
(45) Date of Patent: May 5, 2009

(54) GEOGRAPHIC AND SPACE POSITIONING SYSTEM AND PROCESS

(76) Inventor: Pierre Kaufmann, Rua Aibi, 42 - Ap. 1102, 05054-010 Sao Paulo - Sp (BR)

( * ) Notice: Subject to any disclaimer, the term of this patent is extended or adjusted under 35 U.S.C. 154(b) by 53 days.

(21) Appl. No.: 10/595,300

(22) PCT Filed: Oct. 4, 2004

(86) PCT No.: PCT/BR2004/000190

§ 371 (c)(1),
(2), (4) Date: Aug. 15, 2006

(87) PCT Pub. No.: WO2005/033733

PCT Pub. Date: Apr. 14, 2005

(65) Prior Publication Data

US 2007/0040733 A1    Feb. 22, 2007

(30) Foreign Application Priority Data

Oct. 8, 2003    (BR) .................................... 0303968

(51) Int. Cl.
*G01S 3/02* (2006.01)
(52) U.S. Cl. ..................................... 342/463
(58) Field of Classification Search ................. 342/463, 342/465, 357.01
See application file for complete search history.

(56) References Cited

U.S. PATENT DOCUMENTS

| | | | |
|---|---|---|---|
| 3,206,605 A * | 9/1965 | Johns | ......................... 356/3.12 |
| 3,643,259 A | 2/1972 | Entner | |
| 5,570,096 A * | 10/1996 | Knight et al. | ........... 342/357.01 |
| 6,166,687 A | 12/2000 | Ishikawa et al. | |
| 6,313,790 B2 | 11/2001 | Chang et al. | |

FOREIGN PATENT DOCUMENTS

| | | |
|---|---|---|
| BR | PI 9101270 | 11/1992 |
| EP | 1 026 519 A1 | 8/2000 |

OTHER PUBLICATIONS

International Search Report for International Application No. PCT/BR2004/000190, dated of mailing Jan. 27, 2005.

(Continued)

*Primary Examiner*—Thomas H Tarcza
*Assistant Examiner*—Fred H Mull
(74) *Attorney, Agent, or Firm*—Darby & Darby P.C.

(57) ABSTRACT

Geographical and space positioning system and process, comprising: a first, a second, and a third base (A, B, C) which are fixed in relation to the earth, but spaced away and disaligned in relation to each other; a space platform (S) which is visible from the fixed bases (A, B, C); at least one target (P) situated on or above the surface of the earth; a transmitter (1) operatively associated with each of the parts defined by the fixed bases (A, B, C) and the space platform (S) in order to emit pulses in a determined frequency, each pulse in a predetermined reference instant; a receiver (2) operatively associated with: each fixed base (A, B, C), each target (P) and with the transmitter (1) in order to receive the pulses in a trajectory covering the distance between the space platform (S) and the fixed base (A, b, C) associated with the receiver (2) a control unit (3) which is operatively connected to both the transmitter (1) and the receiver (2) in order to calculate, for each pulse emission instant, the lateral edges of the tetrahedron, whose vetices are defined by the three fixed bases (A, B, C) and by the space platform (s), based upon the determination of the propagation time of each pulse in the trajectory, between the space platform (S) and each fixed base (A, B, C), in order to allow determining a respectice extension of the trajectory of the space platform (S), while the latter is visible by the fixed bases (A, B, C) and determining, at the same time, its equation of motion, allowing calculating the possible positions of the target (P) in the control unit (3) and in the target (P) itself.

32 Claims, 3 Drawing Sheets

OTHER PUBLICATIONS

Watt, A.D., *VLF Radio Engineering*. Pergamon Press, Oxford, England, 1967, p. v-3.

Jones, T.B., "The Propagation of Low and Very Low Frequencey Radio-Waves", NATO/AGARD Lecture Series No. 93, USA, 1978, abstract.

Herbert, N.F., "Omega Navigation System User's Guide", Document of the US Navy, Washington, DC, USA, 1978.

Kouba, J., "A Review of Geodetic and Geodynamic Satellite Doppler Positioning", in *Navigation: Land, Sea, Air & Space*. M. Kayton, IEEE Press, New York, USA, 1990, p. 44.

ARGOS User's Manual, Service Argos Inc., www.argosinc.com.

Vincent, P. et al., "Impact of the Doris Precise Orbit Determination System on Climate Change Studies", 52nd International Astronautic Congress, Toulouse, France, Oct. 1-5, 2001. Or on internet page http://www.aviso.cls.fr/html/faq/doris_uk.html.

Wells, D.,"Guide to GPS Positioning", Canadian GPS Association, N. Brunswick, Canada, 1987, p. 1-17.

Cariveau, B.K. et al., "Satellite Data Management in DoD NAVSTAR GPS Receivers", Collins Government Avionics Division, Rockwell International, IEEE Position Location and Navigation Symp., pp. 134-144, 1988.

Teasy, S.P., et al "Differential GPS Navigation", pp. 131, 1990.

"Guide to GPS Positioning System—GPS Primer", by Aerospace Corporation, Aug. 1997.

* cited by examiner

GEOGRAPHIC AND SPACE POSITIONING SYSTEM AND PROCESS

FIELD OF THE INVENTION

The present invention innovates in relation to other geographic and space positioning systems and processes in that it allows determining the position, the trajectory and the equation of motion of a platform situated in different and discrete locations in space, for example an artificial satellite, and determining, at the same time, positions of targets situated on the ground or in space, based on the concept of the correlation between the time differences in the propagation of radio signals that are retransmitted by the space platform, by using geodesic reference bases on the surface of the earth. The invention dispenses any processings on board of the satellite, requiring simple detectors and processors in the targets, whose positioning is to be determined. The same space platform can eventually be used for data communication of the position of the targets.

BACKGROUND OF THE INVENTION

The systems and methods for determining the positions on the surface of the earth for topography or navigation applications have been developed through the centuries, by using technology and calculation resources available in the corresponding times. The great technological advances verified in the last century allowed the introduction of systems using increasingly sophisticated instruments, such as improved theodolites, better precision of clocks and improved knowledge of the small deviations in the rotation of the earth, with special emphasis being given to remote determination techniques, by using electromagnetic waves, particularly in radio bands, infrared rays, and visual contact.

At great distances, for example hundreds to thousands of kilometers, it is no more possible to establish a direct visual contact between a reference base and the targets whose positions are to be determined. New technologies have been developed for distant geographic determinations, both for targets on the earth's surface and in the atmosphere thereof. For mobile targets, it is possible to determine their displacements and conduct the remote navigation thereof.

Between 1950 and 1980 geographic positioning systems were used, employing transmissions of very long radio waves, emitted in very low frequencies (VLF typically defined in the range of 10-30 kHz), or in low frequencies (LF, typically about 100 kHz), by transmitters situated in very well determined geodesic positions, constituting the systems known as Omega and Loran-C, respectively. These networks had worldwide coverage, allowing the approximate positioning for ground, sea and air navigation to be obtained with a precision of 5-15 km, thousands of kilometers away from the fixed transmitters. The precision of the methods employing VLF and LF depends on the time of the day, on the season of the year, and on the solar and geomagnetic activities. Such methods are restricted to localization only, requiring other communication means to transmit the position data to the central stations which process the information for monitoring and navigation. There are several bibliographic references that describe these systems and processes, such as the book "VLF Radio Engineering", by A. D. Watt, Pergamon Press, Oxford, England, 1967; the articles "The Propagation of low and very low frequency radio-waves", by T. B. Jones, NATO/AGARD Lecture Series No. 93, USA, 1978, and "Omega Navigation System User's Guide, by N. F. Herbert, document of the US Navy, Washington, D.C., USA, 1978. From the eighties on, new geographic positioning systems have been implanted, employing radio-waves and artificial satellites. One of such systems is based on frequency deviation, known as Doppler effect, of the radio transmissions effected by the target or by the platform whose position is to be determined, and which is caused by the motion of the satellite in relation to the target, as compared to the Doppler effects of transmissions from the bases whose positions on the ground are known. The system uses low orbit satellites and requires processing the composition of the Doppler effects to determine the position of the target. For each determination, some measurements are necessary in different positions of the satellite. Communicating the positions processed in the central base to the user requires the use of an independent communication system. The precisions are of the order of meters, or even less, of the order of centimeters. There are many descriptive references about this localization technique, such as "A review of geodetic and geodynamic satellite Doppler positioning", by J. Kouba, in "Navigation: Land, Sea, Air & Space," published by M. Kayton, IEEE Press, New York, USA, 1990, p. 44, and other publications applied to ARGOS satellite system, whose services are sponsored by the French space agency CNES and by the US space agencies NASA and NOAA and described in ARGOS User's Manual, Service Argos Inc., www.argosinc.com, as well as to DORIS satellite system, described for example in the annals of the CNS event called Doris-Days and which took place in Toulouse, France, May 2-3, 2000, in "Impact of the Doris precise orbit determination system on climate change studies", by P. Vincent et al., 52nd International Astronautical Congress, Toulouse, France, Oct. 1-5, 2001, or in the internet page: http://www.aviso.cls.fr/html/faq/doris-uk.html. Another positioning system which is widely used nowadays is based on triangulations in relation to radio signals from several satellites that are simultaneously present above the horizon, whose ephemeris and positions are well known, besides being constantly updated. The most successful and well known system is the "Global Positioning System", GPS, from the United States Defense Department and which consists of 27 satellites orbiting with 12-hour translations. The targets are passive, only receiving the signals from the different satellites, processing their positions with ephemeris data of the satellites and with installed programs. The precisions are from meters to several centimeters, even only some centimeters in military applications. For transmitting position data to the external user, it is necessary to employ other independent telecommunication network. There are many bibliographic references about this system, emphasis being given to the book "Guide to GPS Positioning", by D. Wells, Canadian GPS Association, N. Brunswick, Canada, 1987; "Satellite Data Management in DoD NAVSTAR GPS receivers", by B. K. Cariveau and K. L. Therkelsen, in "Navigation: Land, Sea, Air & Space", published by M. Kayton, IEEE Press, New York, USA, 1990, p. 120; "Differential GPS Navigation", by S. P. Teasey et al. in "Navigation: Land, Sea, Air & Space", published by M. Kayton, IEEE Press, New York, USA, 1990, p. 131, "The Global Positioning System—GPS Primer", by The Aerospace Corporation, Los Angeles, Calif., USA, August 1997. The above cited networks and processes that use satellites for geo-positioning are controlled by government agencies or large companies, which employ very sophisticated satellites, such as the systems using the Doppler effect, and highly elaborated satellites, such as NAVSTAR of the GPS constellation. These options require independent systems for communicating geo-positioning and navigation data to controlling or monitoring central stations. The costs of the independent telecommunication services represent an important fraction in the total budget of the operational cost of said systems.

An alternative system of geographic localization on the ground has been proposed, employing radio signals emitted from reference bases and from targets on the ground and retransmitted in the space by ephemeral reflectors, such as meteor ionized tracks in the earth's atmosphere, disclosed in Brazilian Patent PI 9101270-8, filed by Pierre Kaufmann on Mar. 25, 1991 and in the Certificate of Addition C19101270-8, filed on May 17, 2002, extending the reflections of the signals in the space to any type of transceivers carried by aircrafts, balloons or satellites.

However, the invention above requires transmissions in at least two reference bases and does not provide, nor describes, the processes and the steps which are necessary to determine the geographic positions. With such system and process it is not possible to obtain the partial or total determination of the trajectory or orbit of the device which is reflecting or retransmitting signals in the space.

OBJECTS OF THE INVENTION

It is an object of the present invention to provide a geographic and space positioning process and system which allow determining positions, trajectories or orbits of space platforms.

It is a further object of the present invention to provide a system and a process as mentioned above, which further allow determining the geographic and space localization of targets on the earth's surface or above.

DISCLOSURE OF THE INVENTION

These and other objects are attained by a geographic and space positioning system comprising:
  a first, a second, and a third base, which are fixed in relation to the earth, but spaced away and disaligned in relation to each other, each base having a previously known location;
  a space platform, visible from the fixed bases and which moves to successive positions, as a function of time, according to a trajectory that is inclined in relation to the rotation axis of the earth;
  a transmitter, operatively associated with each of the parts defined by the fixed bases and the space platform, in order to emit pulses, in a determined frequency, each pulse in a predetermined reference instant;
  a receiver in order to receive said pulses in a trajectory covering the distance between the space platform and the fixed base associated with the receiver; and
  a control unit which is operatively connected to both the transmitter and the receiver, in order to calculate, for each pulse emission instant, the lateral edges of a tetrahedron, whose vertices are defined by the three fixed bases and by the space platform, based on the determination of the propagation time of each pulse in said trajectory, between the space platform and each fixed base, in order to allow determining a respective extension of the trajectory of the space platform, while the latter is visible by the fixed bases.

The present system further comprises, in a target, whose geographical position is to be determined and in relation to which the space platform is visible: a receiver, receiving the pulses emitted by the transmitter and retransmitted by the space platform, said receiver being operatively connected to the control unit, said control unit calculating a straight line segment connecting the target and the space platform, in order to allow determining the position of said target through the successive intersection of multiple spherical loci, each locus represented by a sphere and at least three of said spheres presenting a center in the space platform and a radius corresponding to the straight line segment defined between said space platform and the target in a determined instant, and the number of intersections of the spherical loci being those sufficient to determine a single point representative of the target position. The precision in localizing targets obtained with the present system is comparable to those achieved by other systems using satellites, reaching 10 meters at the beginning and improving to one meter or less, as the trajectory of the space platform used is progressively better determined by means of a higher number of determinations, which is achieved employing the system described herein.

The present invention further provides a geographic and space positioning process, comprising the steps of:

a—providing a first, a second, and a third base, which are fixed in relation to the earth, and which are spaced away and disaligned in relation to each other, each having a previously known location;

b—providing a space platform, visible by the fixed bases and which moves to successive positions, as a function of time, according to a trajectory that is inclined in relation to the rotation axis of the earth;

c—providing a transmitter, operatively associated with each of the parts defined by the fixed bases and the space platform, in order to emit pulses in a determined frequency, each pulse in a predetermined reference instant;

d—providing a receiver in order to receive said pulses in a trajectory covering the distance between the space platform and the fixed base associated with the receiver; and e—providing a control unit which is operatively connected to both the transmitter and the receiver, in order to calculate, for each pulse emission instant, the lateral edges of a tetrahedron, whose vertices are defined by the three fixed bases and by the space platform, based on the determination of the propagation time of each pulse in said trajectory, between the space platform and each fixed base, in order to allow determining a respective extension of the trajectory of the space platform, while the latter is visible by the fixed bases.

The geographic and space determination process of the present invention further comprises, for determining the position of a target, the additional steps of providing, in a target, a receiver operatively associated with the transmitter, in order to receive said pulses in a trajectory covering the distance between the space platform and said target, as well as with the control unit, said control unit calculating a straight line segment which connects the target to the space platform, in order to allow determining the position of said target through the successive intersection of multiple spherical loci, each locus being represented by a sphere, with at least three of said spheres presenting the center in the space platform and the radius corresponding to the straight line segment defined between said space platform and the target in a determined instant, and the number of intersections of the spherical loci being those sufficient to determine a single point representative of the target position.

The present invention presents procedures which are necessary to overcome the indeterminations inherent to the known prior art geo-localization systems, by using reflectors or transducers in the space, which procedures can be extended to targets located above the surface of the earth.

The same space platform utilized to obtain positionings on the ground and in the space can also be utilized for data communication and dissemination between targets, between said targets and the position processing station, if necessary, and vice-versa, permitting the option of being totally autonomous, i.e., without necessarily depending on other communication means.

BRIEF DESCRIPTION OF THE DRAWINGS

The invention will be described, based on the appended drawings, in which.

DESCRIPTION OF THE ILLUSTRATED EMBODIMENT

The results proposed by the present invention are obtained through a system constituted by at least three bases, which are fixed in relation to the earth and, for example, located on the surface thereof, namely, a first base A, a second base B, and a third base C, which are spaced away and disaligned in relation to each other and each having its respective geographic position well determined, said system further comprising: a space platform S, visible by said first, second and third fixed bases A, B, C and which moves to successive positions, as a function of time, according to a trajectory that is inclined in relation to the rotation axis of the earth; a transmitter 1 operatively associated with each of the parts defined by the first, the second and the third bases A, B, C and with the space platform S, in order to emit pulses in a determined frequency, each pulse in a predetermined reference instant; a receiver 2 in order to receive said pulses in a trajectory covering the distance between the space platform S and the fixed base A, B, C associated with the receiver 2; and a control unit 3, which is operatively connected to both the transmitter 1 and the receiver 2, in order to calculate, for each pulse emission instant, the lateral edges of a tetrahedron, whose vertices are defined by the three fixed bases A, B, C and by the space platform S, based on the determination of the propagation time of each pulse in said trajectory, between the space platform S and each fixed base A, B, C, in order to allow determining a respective extension of the trajectory of the space platform S, while the latter is visible by the fixed bases A, B, C.

The transmissions from the fixed bases A, B, C to the space platform S occur, for example, in the radio-wave band and can be effected in the same frequency or in different frequencies, carrying the data in a coded form.

In a constructive option of the present invention to be described ahead, the first fixed base A comprises a transmitter 1, and each of the first, second and third fixed bases A, B, C is provided with a respective receiver 2 and, for example, a respective precision clock 4, said clocks being synchronized with each other.

In this construction, the transmitter 1 emits pulses in a determined frequency, each pulse in a predetermined reference instant and containing identification of said first fixed base A and of the emission instant of said pulse, each pulse being transmitted to all fixed bases A, B, C through a communication device 5 provided in space platform S. In another embodiment of the present invention, the second fixed base B is provided with another transmitter, whose pulse is received in another receiver provided in the third fixed base C. In this embodiment, the first fixed base A, for example, is not provided with receivers.

In this embodiment, the other transmitter installed in the second fixed base B emits pulses in a determined frequency, each pulse in the same predetermined reference instant of each pulse emitted by the transmitter 1 provided in the first fixed base A and containing identification of the second fixed base B and of the emission instant of said pulse. In this case, the other receiver provided in the third fixed base C receives and identifies the pulses sent by the second fixed base B and transmitted by the space platform S, and the control unit 3 calculates, for each pulse emission instant of the first and second fixed bases A, B, the lateral edges of a tetrahedron with three vertices defined by the three fixed bases A, B, C and a fourth vertex defined by the space platform S, based on the time differences between the emission instant of a pulse from the first fixed base A and its reception in the latter, in the second and the third fixed base B, C, respectively, and on the time difference between the pulse emission from the second fixed base B and its reception in the third fixed base C, in order to allow determining a respective extension of the trajectory of the space platform S, while it is visible by the fixed bases. In a constructive option of the present solution, the communication device 5 is defined by a transceiver. Since the fixed bases can occupy different conditions as the first, the second and the third fixed base, as a function of the displacement of the space platform S, in a way of carrying out the present invention, all the fixed bases A, B, C are provided with the same constituents of the present system.

With this positioning system thus constituted, it is possible to determine extensions of the trajectory of the space platform S, while it is simultaneously visible by each of the three fixed bases A, B, C, as well as the equation of motion of said space platform S. According to a constructive option of the present invention, illustrated in FIG. 4, each of the first, second and third fixed bases A, B, C presents a respective auxiliary control unit 3 defining a respective other communication device, as described below, which calculates said time differences mentioned above. In this construction, each control unit 3 reads a respective precision clock 4, commands and coordinates the output of information to a communication means and memorizes, compares and processes the data received by the respective receivers 2 of the corresponding fixed bases A, B, C. In this embodiment, there is also provided a central control unit 6 which receives the data from the fixed bases A, B and C.

Besides determining trajectory extensions for the space platform S, the system of the present solution allows the geographic and space determination of targets, in relation to which the space platform is visible.

For such positioning determination, each target P comprises: a receiver 2 receiving the pulses emitted by the transmitter 1 and retransmitted through the space platform S, and being operatively connected to the control unit 3, which calculates, for each pulse received from the transmitter 1, a straight line segment connecting, to the target P, the space platform S, in order to allow determining the position of said target P through the successive intersections of multiple spherical loci LE, each locus being represented by a sphere and with at least three of said spheres presenting the center in the space platform S and the radius corresponding to the straight line segment defined between said space platform S and the target P in a determined instant, with the number of intersections of the spherical loci LE being those sufficient to determine a single point representative of the position of the target P.

According to the system of the present invention, the spherical loci LE should be in a number sufficient so that they define a circle in the first intersection, two points in this circle in the second intersection, and a single point, located in the space in the third intersection and which precisely defines the position of a respective target P.

The geographical and space positioning of the present invention is obtained according to the process as described below.

According to one way of carrying out the present invention, in a first and determined instant or reference time, the first base A transmits its identification codifying its transmission, for example, through a pulse.

This pulse is received by the communication device 5 provided in space platform S, which retransmits it toward the fixed bases and toward each target P, in the same or in other frequencies. The pulse generated by the fixed base A and retransmitted by the communication device 5 is received by the first, the second and the third fixed bases A, B, C.

The central control unit 6, for example, compares the first reference time received from the first fixed base A with the current time in the respective fixed bases A, B, C, defining time differences corresponding to the propagation time of the pulse of the first fixed base A retransmitted by the space platform S to the first, to the second and to the third fixed bases A, B, C. The three time differences, corresponding to the respective propagation times, allow determining said tetrahedron with vertices in the space platform S and in the three fixed bases A, B, C on the ground. In another construction, in each same reference time, the second fixed base B transmits, simultaneously, a pulse which is coded with the time of its emission and with the identification of said second fixed base B. These pulses are received by the communication device 5 provided in the space platform S, which retransmits them toward the fixed bases and the targets, in the same or in other frequencies. The coded pulse coming from the first fixed base A and retransmitted by the communication device 5 is received by the second and the third fixed bases B, C.

The central control unit 6, for example, compares the first reference time received from the first fixed base A with the current time in the respective fixed bases B, C, defining time differences corresponding to the propagation time of the pulse from the first fixed base A, retransmitted by the space platform S to the second and third fixed bases B, C, The third fixed base C receives the pulse from the second fixed base B, retransmitted by the space platform S, said information being forwarded to the control unit 6, which compares the first reference time received from the second fixed base B with the current time in the third fixed base C, defining the time difference corresponding to the propagation time of the pulse of the second fixed base B, retransmitted by the space platform S to the third fixed base C. The three time differences corresponding to the respective propagation times allow determining the referenced tetrahedron with vertices in the space platform S and in the three fixed bases on the ground.

The solution of the tetrahedron, with all its edges being known, allows determining the height of the space platform S for the instant coded in the pulses which are emitted in the first instant and transmitted by the first fixed base A and by the second fixed base B, in relation to the plane defined by the three fixed bases situated on the ground, for example. The heights of the space platform S in relation to the surface or to the center of the earth are derived by well known geometric and algebraic procedures. Successive determinations of the position of the space platform S in successive instants allow determining its trajectory, or its orbit, when said space platform S is an artificial satellite.

In relation to the determination of the position of each target P, for pulses transmitted in a determined first instant, the distance calculated between the space platform S and each target P defines a locus in the space represented by a sphere, with the center in the space platform S, whose surface contains the target P and intercepts the earth's surface, which considered as being approximately spherical, with the radius of curvature being known in the region where the measurements are made, defining a circle on its surface. The univocal determination of the position of each target P is obtained by making successive measurements in different instants, preferably in a short sequence, producing offset loci, whose intersections will define only one point, which will be the position of a determined target P. This univocal solution will be possible only under the condition that the trajectory of the space platform S is not a straight line in the space and that its projection on the surface of the earth is not rectilinear.

The system and the process of the present invention allow determining the trajectory or orbit of the space platform S and its equation of motion, further allowing determining the positioning of each target P with no need of processing again the data of the reference fixed bases at each determination.

Instrumental systematic time delays can be caused, for example, by the transceiver of the space platform S when retransmitting the reference pulses sent by the fixed bases, or by propagation residual effects. These delays can cause deviations in the propagation times, which can be determined by using a fourth reference fixed base, not illustrated, with a well known geodesic position. In this case, the systematic time delays to be determined are inferred by performing the procedures described above for a reference target P of known position.

The positionings can be extended to targets situated hundreds to thousands kilometers from the platform, depending on the gains and powers used in the transceivers.

The measurement obtained for determining the positions of the targets can be processed in a central control unit 6, which receives said measurements through a data communication or transportation means. When the trajectory and equation of motion of the space platform S are adequate established by using the system and process being described herein, the data processing for determining the positions can be effected for example in the target P itself by a control unit 3 provided therein.

In another embodiment made possible by the present solution, adopting the retransmission of the pulses received from the reference fixed bases by the targets, their positions can be remotely determined and, in this case, dispensing the use of precision clocks and time comparisons in the targets, after determining the equation of motion of the space platform S and the communication time between the target to have its positioning determined and a control unit 6 remote from this target P.

Figure 1:
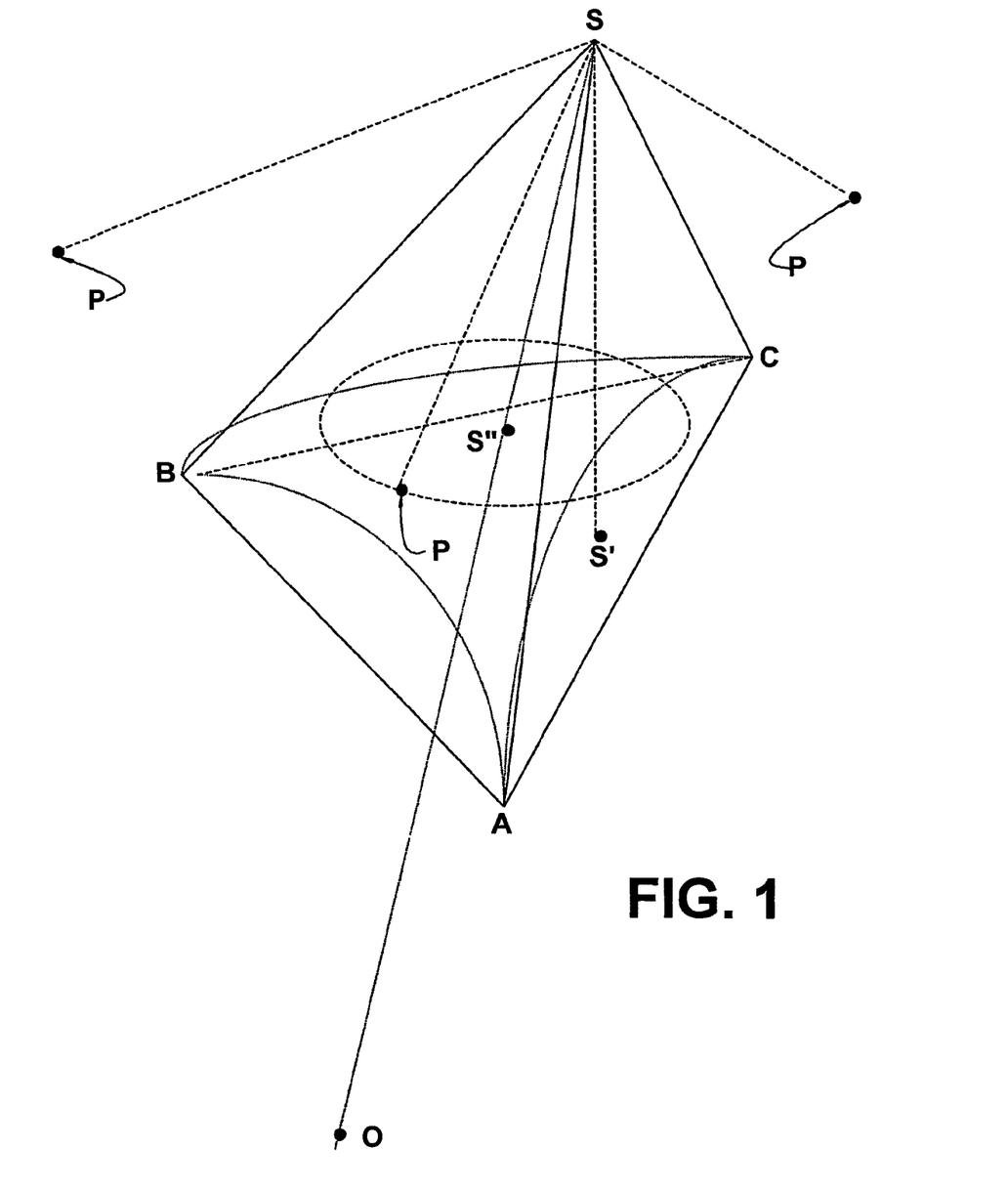
FIG. 1 illustrates, schematically, a perspective view of a section of the earth's surface, represented by a spherical triangle and a space platform, indicating the distance relations therebetween and between the center of the earth, and the loci of the targets situated on and above the spherical surface of the earth and whose positions are to be determined with the present invention.

FIG. 1 shows a section of the earth's surface, represented by a spherical triangle whose radius is equal to the radius of curvature of the earth, centered in O and whose vertices are situated in the three fixed bases, A, B and C with well known geodesic positions, which also define a plane.

Figure 2:
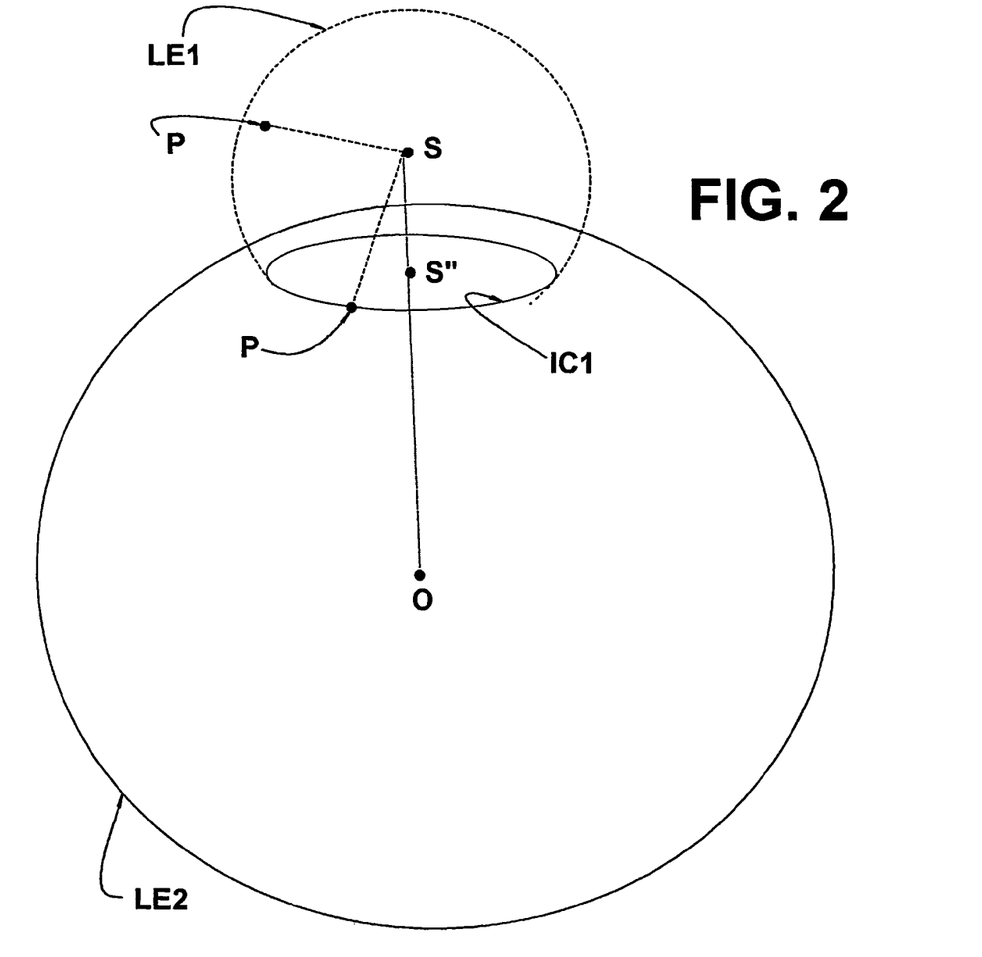
FIG. 2 illustrates, schematically, a diametrical sectional view of the earth in the region where the space platform is positioned and indicating, on the earth's surface and in the space, the loci of the targets to have their positions determined through the present invention.

FIG. 2 illustrates the intersection of a first spherical locus LEI, with the radius in the space platform S, which is the locus of all the possible solutions in the space, centered in the space platform S, with a second spherical locus LE2, with the radius in the center O of the earth and which defines a first circular intersection IC1, which is the locus of all the possible solutions on the earth's surface. The system conceives the transmission of electromagnetic waves, for example in radio frequencies, through one, two, or all fixed bases, which are retransmitted by the space platform S and by the target P. The radio-transmissions can be effected in only one or in different frequencies, continuously or by pulses, according to the chosen technologies for codification of the transmitted and received data. These technologies are known and their selection is not an object of the present invention. According to one way of carrying out the present invention, the trajectory of the space platform S is determined based on the determination of the edges and the height of the tetrahedron described above, for a number of positions of said space platform S as a function of time, since for each time interval considered, the present system determines a respective extension of the trajectory of the space platform S. In a first and determined instant, called t1 herein, said tetrahedron has the edges and height thereof determined by the first fixed base A transmitting its identification code with one instant t1(A). These data, carried by modulated signals or pulses, are received by the space platform S, which retransmits them to the three fixed bases A, B, C, in which are processed the time differences between the arrival instant of the coded signal with the instant t1(A) and the local time given by the clocks of the fixed bases AA(t1), AB(t1) and AC(t1) in the first, in the second and in the third fixed bases A, B and C, respectively. These three time differences are sent to the central control unit 6, where they are processed to determine the edges of the tetrahedron defined by AS, BS and CS, for the instant t1, whereby the height of said tetrahedron is calculated, indicated in FIG. 1 by the segment SS', perpendicular to the plane containing the fixed bases A, B and C. The segment SS' is the only existing solution for the instant of the measurements and, by determining it, it is possible to calculate the height of the space platform S above the surface of the earth. The trajectory of the space platform S is established with the successive determination of the edges and height of the new tetrahedrons obtained for a number of positions of the space platform S as a function of time. For each measurement, the segment can be determined by connecting the space platform S to the target P, whose solutions describe a spherical locus, in the space, with the center situated in the space platform S, which intersects the surface of the Earth forming a circle indicated in FIG. 2, centered in S" and which defines a circular intersection located in the intersection of the axis that connects the space platform S to the center of the earth O.

In the first instant, the pulse emitted by the first base A, t1(A), retransmitted by the transceiver on board the space platform S, is received by the target P which, for example, determines the difference of the same instant recorded by the precision clock 1 of said target P, AP(t1), before sending this information to the control unit 3 or central control unit 6, determining the straight line segment uniting the space platform S with the target P, for said instant t1. The localization of the target on the earth's surface with only one measurement presents indetermination and it can be situated in any position on the surface of a sphere LEI, as illustrated in FIG. 2, or in the circle IC1, which is the intersection of the sphere with the surface of the earth. As already described, successive measurements are necessary to raise the indetermination and univocally define the geographic position of the target P.

Figure 3:
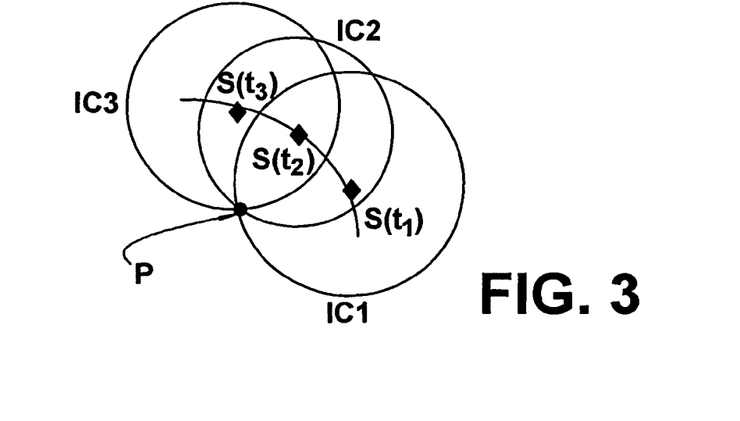
FIG. 3 illustrates, schematically, part of the trajectory of the space platform and the localization of the loci of the targets situated on and above the earth's surface, obtained with the system and process of the present invention.

FIG. 3 exemplifies the procedure for the geographic and space localization of the present invention, in the particular case of a target P on the surface of the earth, showing the projection of the instants of the measurements, the corresponding positions of the space platform S and the circular loci IC corresponding to the intersection of the straight line segment uniting the target P and the space platform S with the earth's surface.

According to the illustrations, the circular intersection for a first instant t1 is represented, in FIG. 3, by IC1, for a projection S(t1) of the space platform S on the ground, for the first instant t1. For a second instant t2, preferentially subsequent and very close to the first instant t1, the space platform S has moved to other projection position S(t2), defining a second circular intersection IC2, offset on the earth's surface in relation to the first circular intersection IC1 and which intersects the first locus IC1 in two points. For a third instant t3, preferentially subsequent and very close to the second instant t2, the space platform S has moved to a third projection position S(t3), defining a third circular intersection IC3 which intersects the prior circular intersection IC2 in only one of the two previously defined points of intersection, univocally determining a geographic position on the surface of the earth. For each instant, the determination of a respective circular intersection IC is obtained as a function of the determination of a respective tetrahedron, as described above. A necessary condition to find only one solution for the geographic position of each target P on the earth's surface is that the projection of the trajectory of the space platform S on the earth's surface is not rectilinear. Such condition is fulfilled for the space platforms S carried by artificial satellites presenting a determined orbital inclination other than the equatorial, due to the resultant of the displacements of the satellite with the time and diurnal movement of the earth in relation 5 to the target P.

For targets P situated above the earth's surface in the space, the first measurement of the instant t1 determines possible positions on the surface of a sphere, having as the center the position of the space platform S and as the radius the straight line segment between the space platform S and the target P. In this case, three more successive measurements similar to the previous ones are necessary to define, univocally, the position of the target P in the space. For each instant there is defined a spherical locus and a circular intersection in the space and, in this case, measurements in a fourth instant t4 are required, in order to define therein a fourth sphere determining a fourth spherical locus LG and a fourth circular intersection IC which intersects a previous circular intersection IC in only one common point corresponding to the position of the target P. For accomplishing these procedures, the four positions of the space platform S cannot be in a straight line. Well known geometric and algebraic procedures are used for carrying out these determinations and calculations. Systematic delays associated with the readings of the time differences t, caused by the electronics of the transceiver on board of the space platform S, should be known when applying the system and process of the present invention. These delays can be determined with adequate precision by applying the system itself, by using a fourth fixed base (not illustrated), of well known geodesic position and whose coordinates will be reproduced with the introduction of the correct instrumental delays.

By knowing the trajectory or orbit of the space platform S and its equation of motion, the present positioning system and process permit the option of processing the data in the target P itself for determining its position.

In one constructive option of the present invention, the determination of the positions of the target P can be achieved without the provision of a precision clock in each target P, by calculating the differences in the propagation trajectories for each measurement and position of the platform, through the knowledge of its equation of motion, by using the present system through known mathematic procedures, processing the time differences only in the central control unit 6, being aware of the acquired times to send the data of the target P to said control unit 6.

Figure 4:
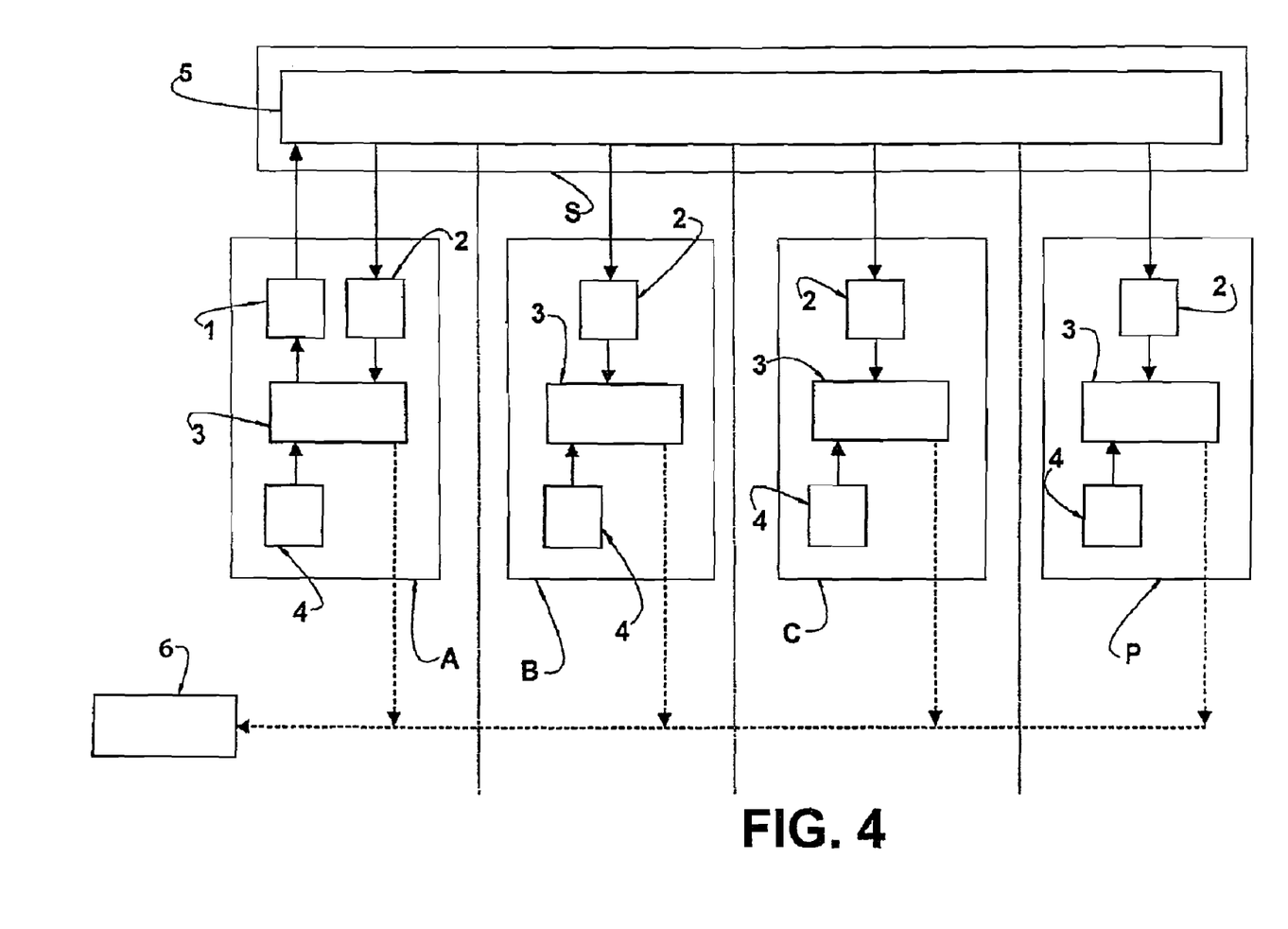
FIG. 4 illustrates, schematically, a block diagram of one embodiment for the system of the present invention, indicating some of the relations between the elements that constitute this system.

FIG. 4 of the appended drawings illustrates a simplified block diagram of the installations and functions provided by the system.

In order to obtain the geographic or space positioning through the system of the present invention, the positioning process of the present invention comprises the following steps of including, in an initial phase:

providing the first, the second, and the third fixed bases, A, B and C, as well as and the space platform S visible by said fixed bases and which moves to successive positions as a function of time and according to a non-rectilinear trajectory in relation to the target, for example inclined in relation to the rotation axis of the earth;

providing a transmitter 1 in order to emit pulses in a determined frequency, each pulse in a predetermined reference instant;

providing a receiver 2 in order to receive said pulses in a trajectory covering the distance between the space platform S and the fixed base A, B, C associated with the receiver; and providing a control unit 3 operatively connected to the transmitter 1 and to the receiver 2, in order to calculate, for each pulse emission instant, each lateral edge of a tetrahedron having three vertices defined by the three fixed bases A, B, C and a fourth vertex defined by the space platform S, based on the time differences of propagation of each pulse between the space platform S and a corresponding fixed base A, B, C, in order to allow determining a respective extension of the trajectory of the space platform S, while the latter is visible by the fixed bases A, B and C.

The present process, in one embodiment, presents the steps of providing, in each fixed base:

a respective precision clock 4, synchronizing said precision clocks 4 with each other for the same common time reference, the transmitter 1 being provided in the first fixed base A in order to emit pulses, in a determined frequency, each pulse in a predetermined reference instant and containing identification of said fixed base A and of the emission instant of said pulse, each pulse being transmitted to all fixed bases A, B, C through a communication device 5 provided in the space platform S.

In this case, the process further comprises the steps of:

providing a receiver in each of the fixed bases A, B, C and operatively connected to the transmitter 1;

receiving and transmitting, through the communication device 5 provided in the space platform S, said pulses transmitted by the first fixed base A;

receiving, in the first, in the second and in the third fixed bases A, B, C, the pulses emitted by the first fixed base A and transmitted by the communication device 5;

calculating the time differences of each pulse received in the first, in the second and in the third fixed bases A, B, C in relation to the emission time of each said pulse emitted by the first fixed base A;

comparing said time differences and informing them to the control unit 6, through a second data communication device;

determining, in the control unit 6, for each pulse emission instant of the first fixed base A, the lateral edges of a tetrahedron with three vertices defined by the three fixed bases A, B, C and with a fourth vertex defined by the space platform S, based on the time differences between the emission instant of one pulse from the first fixed base A and the reception of said pulse in the first, in the second and in the third fixed bases A, B, C, respectively.

According to the present invention, the process further includes the steps of:

providing a precision clock 4 installed in each of the first, the second and the third fixed bases A, B. C;

synchronizing the times of the precision clocks 4 in the three fixed bases A, B, C to the same common time reference;

transmitting pulses, through the first fixed base A, each pulse containing a coded information about the reference emission instant of each said pulse and about the identification of said first fixed base A;

receiving and transmitting, through a communication device 5 provided in the space platform S, said pulses transmitted by the first fixed base A;

receiving, in the first, in the second and in the third fixed bases A, B, C, the pulses emitted by the first fixed base A and transmitted by the communication device 5;

calculating the time differences of each pulse received in the first, in the second and in the third fixed bases A, B, C in relation to the emission time of each said pulse emitted by the first fixed base A;

comparing said time differences and informing them to the control unit 6, through another data communication device;

determining, in the control unit 6, for each pulse emission instant of the first fixed base A, the lateral edges of a tetrahedron with three vertices defined by the three fixed bases A, B, C and the fourth vertex defined by the space platform S, based on the time differences between the emission instant of one pulse from the first fixed base A and its reception in the first, in the second and in the third fixed bases A, B, C, respectively, in order to allow determining a respective extension of the trajectory of the space platform S, while the latter is visible by the fixed bases.

The communication device 5 provided in the space platform S receives and transmits said pulses transmitted by the first fixed base A, which are received in the first, in the second and in the third fixed bases A, B, C.

The time difference processed in each fixed base is sent, for example to a remote control unit, through any communication system, jointly with the code of each fixed base.

Such process steps are carried out also for the target P whose position one wishes to determine, sending the data of the time differences AP(t1), respectively, to for example the central control unit 6, through a communication means, which receives the pulses with coded data identifying the fixed bases and the target P, as well as the four time differences AA(t1), AB(t1), AC(t1) and AP(t1), which are necessary to determine the three edges of the tetrahedron, uniting the vertices of the fixed bases with the space platform S, as well as the straight line segment between the position of the space platform S and the target P whose position is to be determined, as illustrated in FIGS. 1, 2 and 3.

The control unit 6 discriminates the pulses, decodes and processes the data, once the propagation velocity of the transmitted waves is known, correcting the systematic delays caused by the transceiver on board the space platform S, so as to allow determining a respective extension of the trajectory of the space platform S while it is visible by the fixed bases.

The control unit 6 receives the pulses with coded data identifying the fixed bases and the target P, as well as the four time differences AB(t1), AC(t1), AA(t1) and AP(t1), which are necessary to determine the three edges of the tetrahedron, uniting the vertices of the latter with the space platform S, as well as the straight line segment between the space platform S and the target whose coordinates on the earth's surface admit all solutions on a circle defined by the intersection of the end of said straight line segment centered in the axis connecting the space platform S to the center 0 of the earth in the instant t1, corresponding to the equation of the locus IC1 illustrated in FIG. 3. Two more determinations are effected, in instants t2 and t3, preferably very close and subsequent to the first instant, obtaining the equations of the loci IC2 and IC3 illustrated in FIG. 3, univocally defining the coordinates of the target P on the earth's surface, with the condition that the projections on the surface of the positions of the space platform S for the three instants are not in a straight line.

For the positioning of the target P above the earth's surface or in space, a fourth determination in the instant t4 is performed, preferably subsequently and very close to t3, univocally determining the position of the target P in the common intersection of the four spheres corresponding to the loci defined in each of the four successive instants, provided that the four positions of the space platform S are not in a straight line.

The calculations for determining the coordinates of the target P based upon the measurements in three or four different preferentially successive instants are effected by the control unit 6, by using well known algebraic and geometric formulations, and any system of coordinates can be used, by adopting, for example, the equation of the earth's surface which is more proximate to the geoidal form of the earth in the measurement regions.

The procedures described herein determine, at the same time, the trajectory of the space platform S and the equation which describes the motion thereof, further allowing the possibility of determining the coordinates of the target P by using only successive positions of the space platform S foreseen by the equation that defines the trajectory, without requiring operations with the second and the third fixed bases B and C.

For positioning measurements using space platforms S with trajectories well determined by the process described herein, such as for example, in artificial satellites, the reference fixed bases on the ground are utilized for the initial determinations of the orbit of the satellite and afterwards for its measurement, correction and ephemeris updating. By adopting the equations of motion of the space platform S, the determinations of the positions of the targets can, in a constructive option, be calculated in a central control unit 6, dispensing the use of a precision clock 4 in each target P, as long as the times spent for sending the data of said targets 7 to the control unit 6 are known. Once the trajectory and the equation of motion of the space platform S are known, the data processing and the position determination can also be carried out in the targets 7 themselves.

Depending on the frequencies, modulations and powers used in the telecommunications, particularly in the transceiver on board of the platform and in the targets whose positions are to be determined, the new system and process described herein is capable of covering distances from hundreds to thousands of kilometers away from the space platform S, either in space or on the earth's surface. The geographic coverage can be amplified by adding a larger number of reference fixed bases on the ground and a larger number of space platforms S separated from each other in the space. For a platform provided in a satellite with a low orbit of 400 km above the earth's surface has a maximum horizon on the surface of about 2000 km, for example.

Estimates on causes of uncertainties related the new system and process indicate that it is possible to obtain precisions of the order of or inferior to 10 meters, depending on the precision of the clocks used, of the knowledge of the radius of curvature of the earth in the measurement regions, of the measurement precision of the altitude of the target P and of the degree of correction of the time delays caused by the electronics on board of the transceiver in space. With the adequate knowledge of the trajectory of the platform, or of the orbit and equation of motion regarding an artificial satellite, the precisions can be considerably improved with successive and repeated measurements.

Successive measurements can be achieved at each complete operation of the system, according to the velocity of the electromagnetic waves and the maximum distance of the targets P above the horizon of the space platform S. For targets at a medium distance of 500-1000 km from the satellite, for example, a complete operation can take 10 milliseconds. By adding, for example, more 10 milliseconds for possible systematic delays in the electronics involved and in the processings, one can foresee at least 600 determinations per minute.

The new geographic and space positioning system and process can assist multiple targets simultaneously, by using digital communication programs and known technologies of electronic circuits with multiple inputs and multiple outputs, in the same or in different transmission frequencies, as well as pulse discrimination and decoding programs. Examples of pulsed communications indicate the possibility of giving simultaneous assistance to hundreds or thousands of targets or users. The development or improvement of these technologies is not an object of the invention.

The transmitters, receivers, modems, clocks, electronics for multiple inputs and multiple outputs, code and pulse discriminators, digital processors and their basic utilization programs, constitute available technologies in the market and are not objects of the invention.

There are alternative applications for the new geographic and space positioning system and process, through transreception or reflection in space platforms S carried by balloons and aircrafts, as well as through reflection in natural barriers in the high atmosphere of the earth, such as ionospheric inhomogeneities and ionized tracks produced by meteors, through measurements made in distinct positions in the space, provided that the projection 1 on the surface of the displacements thereof is not rectilinear.

Different bands of the electromagnetic spectrum can be used for transmitting data by radio, by infrared rays, by visible contact, etc.

The communication between the reference fixed bases A, B, C and the targets with the central processor can also be made through any type of link, such as through optical fibers or radio-communication links. The position data can be processed immediately, in real time, or a long time after making the measurements.

Due to the simplicity of the new system, which requires a relatively simple technology, as well as the several processing alternatives and the data communication means, the invention described herein promotes an expressive cost reduction in the investments, by using a small platform carrying only one transceiver, ground technologies with low complexity, and autonomous services, without necessarily depending on other systems that use bulky platforms carrying complex instruments for on board and remote processing, or multiple platforms at great distances from the earth, with complex on board instrumentation, all of them depending on separate means for telecommunicating the calculated position data.

The invention claimed is:

1. A geographic and space positioning system comprising:
    a first, a second, and a third base which are fixed in relation to the earth, spaced away and each having an offset alignment in relation to each other and each having a previously known location, wherein the three bases are not aligned in a straight line;
    a space platform, simultaneously visible from the three fixed bases and which moves to successive positions, as a function of time, according to a space platform trajectory that is inclined in relation to the rotation axis of the earth;
    a transmitter, installed in at least one of the fixed bases in order to emit pulses in a determined frequency, each pulse in a predetermined reference instant;
    a receiver for each of the fixed bases, each receiver being installed in one of the fixed bases in order to receive said pulses in a signal trajectory covering the distance between the space platform and the fixed base associated with the receiver, wherein said pulses are reflected by the space platform from the transmitter to the receiver;
    a precision clock in each of the fixed bases, the precision clocks being synchronized with each other; and
    a control unit operatively connected to both the transmitter and each receiver, in order to calculate, for each pulse emission instant, the lateral edges of a tetrahedron, whose vertices are defined by the three fixed bases and by the space platform, based upon the determination of the propagation time of each pulse, in said signal trajectory, between the space platform and each fixed base in order to allow determining a respective extension of the space platform trajectory, while the latter is visible by the fixed bases, the tetrahedron edges being obtained with the time differences between the instant of the emission of each pulse and the instant of the arrival at each fixed bases.

2. The system according to claim 1, wherein the transmitter is installed in the first fixed base in order to emit pulses in a determined frequency, each pulse in a predetermined reference instant and containing identification of said first fixed base and of the emission instant of said pulse, each pulse being transmitted to all fixed bases through a communication device provided in the space platform.

3. The system according to claim 2, wherein the communication device is a transceiver.

4. The system according to claim 2, wherein the communication device utilizes radio-waves.

5. The system according to claim 1, further comprising:
    another transmitter installed in the second fixed base in order to emit pulses in a determined frequency, each pulse in the same predetermined reference instant of each pulse emitted by the transmitter provided in the first fixed base and containing identification of the second fixed base and of the emission instant of said pulse; and
    another receiver provided in the third fixed base in order to receive and identify the pulses sent by the second fixed base and transmitted by the space platform, the control unit calculating, for each pulse emission instant of the first and second fixed bases the lateral edges of a tetrahedron with three vertices defined by the three fixed bases and with the fourth vertex defined by the space platform, based on the time differences between the emission instant of a pulse from the first fixed base and its reception in the latter, in the second and in the third fixed base, respectively, and on the time difference between the emission of the pulse from the second fixed base, in order to allow determining the respective extension of the space platform trajectory, while it is visible by the fixed bases.

6. The system according to claim 5, wherein the control unit calculates, for consecutive pulses transmitted by the second fixed base, the equation of motion of the space platform.

7. The system according to claim 1, wherein the control unit is operatively connected to the second and to the third fixed bases through other respective communication means provided in each one of said fixed bases.

8. The system according to claim 1, wherein the control unit is operatively connected to the fixed bases.

9. The system according to claim 8, wherein each of the first, the second and the third fixed bases is provided with a respective control unit, said control units defining the other communication devices and being operatively connected to another control unit remote in relation to those of said fixed bases.

10. The system according to claim 1, further comprising a target, whose geographic position is to be determined and in relation to which the space platform is visible wherein the target comprises:
    a receiver, receiving the pulses emitted by the transmitter and retransmitted through the space platform and being operatively connected to the control unit, which calculates a straight line segment connecting, to the target, a fourth vertex of a tetrahedron, in order to allow determining the position of said target through the successive intersection of multiple spherical loci, each locus being represented by a sphere and with at least three of said spheres presenting the center in the space platform and the radius corresponding to the straight line segment defined between said space platform and the target, in a determined instant, with the number of intersections of the spherical loci being those sufficient to determine a single point representative of the position of the target.

11. The system according to claim 10, wherein the spherical loci are sufficient to define a circle in the first intersection, two points of this circle in the second intersection and only one point in the space in the third intersection.

12. The system according to claim 11, wherein at least one spherical locus presents the center coinciding with the center of the earth.

13. The system according to claim 12, wherein the control unit calculates, for each consecutive pulse of the first fixed base, a respective spherical locus and its circular intersection on the earth's surface, said control unit calculating, for each three consecutive pulses, the respective circular intersection on the earth's surface, said circular intersections mutually intercepting so as to define a single geometric position of the target on the earth's surface.

14. The system according to claim 13, wherein for each respective spherical locus and its circular intersection on the earth's surface, the control unit utilizes, for each consecutive pulse of the first fixed base, a respective consecutive pulse of the second fixed base.

15. The system according to claim 1, wherein the fixed bases are situated on the earth's surface.

16. The system according to claim 1, wherein the control unit calculates, based on the time differences of propagation of each pulse between the space platform and a corresponding fixed base, for consecutive pulses, the equation of motion of the space platform.

17. The system according to claim 1, wherein the control unit calculates, for consecutive pulses transmitted by the first fixed base, the equation of motion of the space platform.

18. The system according to claim 17, wherein the control unit calculates the position of at least one target from the equation of motion of the space platform.

19. The system according to claim 18, wherein the target further comprises a control unit which calculates the position of said target from the equation of motion of the space platform.

20. The system according to claim 19, wherein the target further comprises a precision clock.

21. A geographic and space positioning process, comprising the steps of:
providing a first, a second, and a third base, which are fixed in relation to the earth and which are spaced away and each having an offset alignment in relation to each other, each having a previously known location;
providing a space platform visible by the fixed bases and which moves to successive positions, as a function of time, according to a space platform trajectory that is inclined in relation to the rotation axis of the earth;
providing a transmitter in order to emit pulses in a determined frequency, each pulse in a predetermined reference instant;
providing a receiver in order to receive said pulses in a signal trajectory covering the distance between the space platform and the fixed base associated with the receiver, wherein said pulses are reflected by the space platform from the transmitter to the receiver;
providing a precision clock in each of the fixed bases, the precision clocks being synchronized with each other; and
providing a control unit which is operatively connected to both the transmitter and the receiver in order to calculate, for each pulse emission instant, each lateral edges of a tetrahedron, with three vertices defined by the three fixed bases and with a fourth vertex defined by the space platform, based on the time differences of propagation of each pulse between the space platform and a corresponding fixed base, in order to allow determining a respective extension of the space platform trajectory, while the latter is visible by the fixed bases.

22. The process according to claim 21, wherein a transmitter in the first fixed base emits pulses in a determined frequency, each pulse in a predetermined reference instant and containing identification of said fixed base and of the instant of emission of said pulse, each pulse being transmitted to all fixed bases through a communication device provided in the space platform, said process including the additional steps of:
transmitting, through the first fixed base pulses, each containing a coded information of the reference emission instant of each said pulse and of the identification of said first fixed base;
receiving and transmitting, through a communication device provided in the space platform, said pulses transmitted by the first fixed base;
receiving, in the first, in the second and in the third fixed bases, the pulse emitted by the first fixed base and transmitted by the communication device;
calculating the time differences of each pulse received in the first, in the second and in the third fixed bases in relation to the emission time of each said pulse emitted by the first fixed base;
comparing said time differences and informing them to the control unit through a second data communication device; and
determining, in the control unit, for each pulse emission instant of the first fixed base, said lateral edges of a tetrahedron, with three vertices defined by the three fixed bases and a fourth vertex defined by the space platform, based on the time differences between the emission instant of a pulse of the first fixed base and its reception in the first, in the second and in the third fixed bases, respectively.

23. The process according to claim 22, further comprising the steps of:
providing another transmitter installed in the second fixed base in order to emit pulses in a determined frequency, each pulse in the same predetermined reference instant of a pulse emitted by the transmitter and containing identification of the second fixed base and of the emission instant of said pulse;
synchronizing the times of the precision clocks in the three fixed bases to the same common time reference;
transmitting pulses, through the first fixed base, each pulse containing a coded information about the reference emission instant of each said pulse and about the identification of said first fixed base;
transmitting pulses, through the second fixed base, each pulse containing a coded information about the reference emission instant of each said pulse in the emission instant of each pulse from the first fixed base and about the identification of said second fixed base;
receiving and transmitting through a communication device provided in the space platform, said pulses transmitted by the first and the second fixed bases;
receiving, in the second and in the third fixed bases, the pulse emitted by the first fixed base and transmitted by the communication device;
receiving, in the third fixed base, the pulse emitted by the second fixed base and transmitted by the communication device;
calculating the time differences of each pulse received in the third fixed base in relation to the emission time of each said pulse emitted by the second fixed base;
comparing said time differences and informing them to the control unit, through a second data communication device; and
determining in the control unit, for each pulse emission instant of the first and the second fixed bases, the lateral edges of a tetrahedron with three vertices defined by the three fixed bases and the fourth vertex defined by the space platform, based on the time differences between the emission instant of a pulse from the first fixed base and its reception in the second and in the third fixed bases, respectively, and on the time difference between the emission of the pulse of the second fixed base and its reception in the third fixed base, in order to allow determining a respective extension of the space platform trajectory, while the latter is visible by the fixed bases.

24. The process according to claim 23, further comprising a step of calculating, in the control unit, for consecutive pulses transmitted by the first fixed base and by the second fixed base, the equation of motion of the space platform.

25. The process according to claim 22, further comprising the additional steps of:

providing, in a target, a receiver operatively associated with the transmitter in order to receive said pulses in a signal trajectory covering the distance between the space platform and said target, as well as with the control unit, said control unit calculating a straight line segment which connects the target to the space platform, in order to allow determining the position of said target through the successive intersections of multiple spherical loci, each locus being represented by a sphere, with at least three of said spheres presenting the center in the space platform and the radius corresponding to the straight line segment defined between said space platform and the target in a determined instant, and the number of intersections of the spherical loci being those sufficient to determine a single point representative of the position of the target.

26. The process according to claim 25, further including the additional steps of calculating, through the control unit:

the intersection of each two successive spherical loci, in order to define a first circular intersection in this intersection;

the intersection of a third spherical locus with the first circular intersection, in order to define a second circular intersection;

the intersection of the second circular intersection with the first circular intersection, in order to define two localization points; and the intersection of a fourth spherical locus with the second circular intersection, in order to define a third circular intersection intercepting one of the two localization points.

27. The process according to claim 26, wherein one of the spherical loci has the center coinciding with the center of the earth and the other spherical loci have the center in the space platform.

28. The process according to claim 25 further comprising a step of providing a precision clock in each target.

29. The process according to claim 22, further comprising a step of calculating, in the control unit, for consecutive pulses transmitted by the first fixed base, the equation of motion of the space platform.

30. The process according to claim 29 further comprising a step of calculating, in the control unit, the position of each target based on the equation of motion of the space platform.

31. The process according to claim 30 further comprising a step of providing, in each target, a control unit calculating the position of said target based on the equation of motion of the space platform.

32. The process according to claim 21 further comprising the step of correcting the time delays in the transmission of pulses through the communication device.

\* \* \* \* \*